Figure 1:
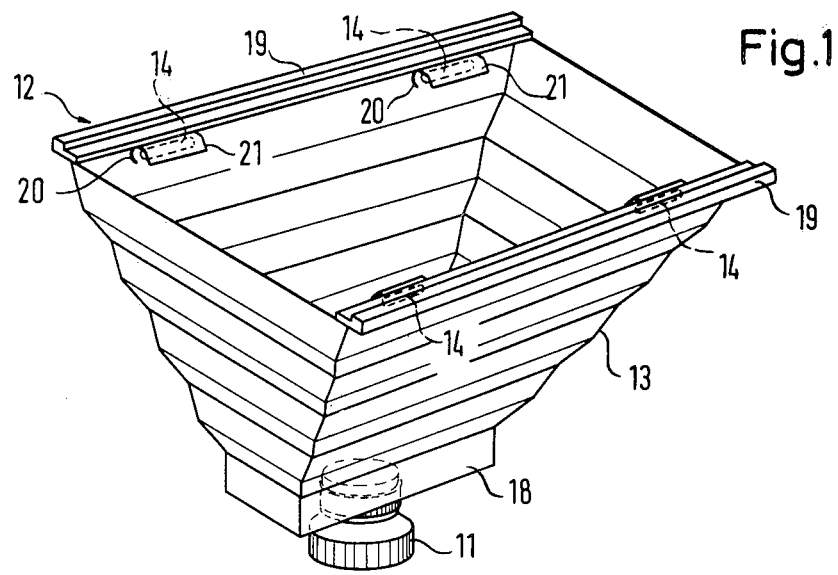

United States Patent [19]
Holthusen

[11] 4,185,914
[45] Jan. 29, 1980

[54] REPRODUCTION CAMERAS AND PRIMING EXPOSURE DEVICES THEREFOR

[75] Inventor: Bernd Holthusen, Hamburg, Fed. Rep. of Germany

[73] Assignee: Dr. Böger Photosatz GmbH, Wedel, Fed. Rep. of Germany

[21] Appl. No.: 919,974

[22] Filed: Jun. 28, 1978

[30] Foreign Application Priority Data

Jun. 29, 1977 [DE] Fed. Rep. of Germany ....... 2729378

[51] Int. Cl.² ............................................. G03B 27/54
[52] U.S. Cl. ................................................... 355/70
[58] Field of Search ................................... 355/69, 70

[56] References Cited
U.S. PATENT DOCUMENTS

| | | | |
|---|---|---|---|
| 3,040,640 | 6/1962 | Abel, Jr. et al. | 355/69 X |
| 3,249,000 | 5/1966 | Pack | 355/70 X |
| 3,619,055 | 11/1971 | Archer et al. | 355/69 |
| 3,823,413 | 7/1974 | Cole | 355/70 X |

FOREIGN PATENT DOCUMENTS 1904366 2/1963 Fed. Rep. of Germany .
272191 1/1928 United Kingdom .

*Primary Examiner*—Richard A. Wintercorn

[57] ABSTRACT

A reproduction camera for producing screen modified images of an original copy suitable for subsequent use in the production of ink printed pictures features an objective lens spaced apart from a film holder located at the image plane of the objective by an extensible bellows. A light source providing the conventional priming (or bump) exposure used in processing screen modified images is arranged within the bellows closely adjacent the edge of the film holder surrounding the image plane. Light from the light source is directed toward the bellows so that only scattered light, which is thus evenly distributed, is received at the image plane. The light source is conveniently four separate lamps arranged generally at the corners of the bellows and the images of these lamps formed at the object plane of the objective helps in initially locating the original from which the screen modified image is to be made.

20 Claims, 2 Drawing Figures

REPRODUCTION CAMERAS AND PRIMING EXPOSURE DEVICES THEREFOR

This invention relates to reproduction cameras and to priming exposure devices therefor and has particular reference to the use of such cameras for producing screen modified images.

Reproduction cameras for producing screen modified images are typically used to produce a photographic image from an original picture or copy which can subsequently be used for producing reproductions by ink printing techniques. The effect of the screen is to modify the image of the original copy so that it comprises a regular matrix of closely spaced dots the size of each of which varies and which cooperate to yield a visual effect equivalent to the contrasting relatively lighter and darker detail of the original copy. The technique is generally referred to as half tone photography.

As is explained e.g. in US-PS No. 3,619,055 it is customary to build a composite image by a combination of generally two of three basic types of exposure namely a priming exposure, sometimes referred to as flash exposure, in which a relatively uniform distribution of light partially exposes the lithographic film through the screen, main exposure in which the image of the original is imaged on the lithographic film through the screen and bump, no screen or highlight exposure in which a supplementary exposure is made from the original without the screen. The effects of these combinations of exposures is to improve the contrast in the screen modified image.

A typical known reproduction camera comprises an objective, a film holder at an image plane spaced apart from the objective and a bellows impermeable to light extending between the film holder (image plane) and the objective which makes it possible to change the separation of these two components and inside of which there is arranged at least one priming light source and light scattering means, which can be synchronised with the main exposure and makes possible a uniform priming exposure of the film material.

Priming exposure with generally uniformly distributed light is necessary with screen modified images in order to take into account the generally poorer ability to reproduce the larger grey tone scale of an original because of the modifying effect of the screen. For carrying out the priming exposure with uniform light various arrangements are already known.

The illuminating lamp for the priming exposure can be fixedly installed opposite to and facing the image plane so that it is either connected to the camera or mounted on a facing wall. The priming exposure can also take place via the objective in which a white or light grey card is continuously present on the holder for the original copy as a reflection surface. It has also already been attempted to achieve the priming exposure with a lamp placed directly in front of the objective. This however has the disadvantage that the priming exposure and the actual imaging exposure have to take place at different times so that the time required for carrying out a single shot is relatively large.

For this reason arranged priming exposure lamps have with small diffusing screens positioned in front of the lamps have also been arranged on both sides of the objective inside the bellows and facing the image plane. An arrangement similar to this is shown in US-PS 3,249,000. During the imaging exposure these priming exposure lamps are likewise switched on so that the priming exposure takes place simultaneously with the imaging exposure. By this means a significant saving of time is achieved.

The disadvantage of this known reproduction camera is that, on account of the relatively short distance from the priming exposure lamp to the screen the illumination of the film material is relatively poor which leads to contrast irregularities from the priming exposure.

The object of the invention is to provide a reproduction camera of the previously named kind by means of which priming exposure and imaging exposure can if desired be simultaneously or synchronously carried out and which will enable a significantly more uniform illumination of the screen by the priming exposure. The invention thus seeks to provide a completely uniform field of light for the priming exposure at the screen, or respectively, at the film material.

According to the present invention there is provided a reproduction camera suitable for producing screen modified images and comprising an objective, a film holder arranged spaced from the objective substantially at the image plane thereof, wall means impermeable to light and extending between the objective and the film holder, at least one source of light for producing a priming exposure and disposed inside the wall means in the region of the film holder, means for preventing direct impingement of light from said at least one source onto the image plane and the interior of said wall means being provided with a light scattering surface for producing scattering of light received from said at least one source onto said image plane.

Also according to the present invention there is provided a priming exposure device suitable for use in a reproduction camera having an objective lens spaced from a film holder disposed substantially at the image plane of the objective and wall means impermeable to light extending between the objective and the film holder, the priming exposure device comprising at least one light source adapted to fit inside a reproduction camera in the region of the image plane, means for preventing, either alone or in combination with a cooperating part of the camera, light from said at least one source impinging directly onto said image plane and means for directing said light onto an internal surface of the wall of the camera.

It is thus arranged that the light source for the priming exposure is so arranged in the vicinity of the edge of the wall adjacent the image plane, which wall is normally in the form of a bellows, that no direct light from the priming exposure light source falls onto the screen and the film material but rather only light scattered at the interior surface of the bellows. The interior surface of the bellows is thus itself used as the light scattering means. By this means not only is the spacing between the light source for primary exposure and the screen, or the film material, relatively large but moreover the apparatus is further characterized by its unusual simplicity, because no additional means are necessary for scattering the light for the priming exposure. An outstanding optical effect is thus achieved by way of the uniformly distributed light achieved by the scattering process and is achieved with relatively less trouble or expense than is the case with prior art arrangements.

Preferably the light sources are arranged beneath a shielding moulding provided at the border of the film holder adjacent the image plane. By this means a simple mounting and a shielding of the screen from direct light is simultaneously achieved.

Preferably the light sources are however provided with a reflector which is usefully so shaped and aligned that the light is directed in general to the central and lower regions of the opposite and neighbouring sides of the bellows. Apart from this the reflector should shield the upper regions of the walls of the bellows and especially that wall of the bellows on which it is arranged. In this manner it is ensured that the scattered light reaching the screen from the light source has travelled a sufficiently large distance.

Advantageously the bellows is of generally rectangular cross section and two light sources are provided spaced apart on each of two longer sides of the upper edges of the bellows. The regular arrangement of the light sources achieved around the upper edge of the bellows ensures on the one hand a sufficient light intensity and on the other hand an optimally uniform illumination for the priming exposure.

In accordance with an especially preferred embodiment the interior of the bellows has a matt black surface. Also the inner surface of the support for the objective should be matt black in order to avoid specular reflections from this region. In any case a shiny interior surface for the bellows should be avoided.

Figure 2:
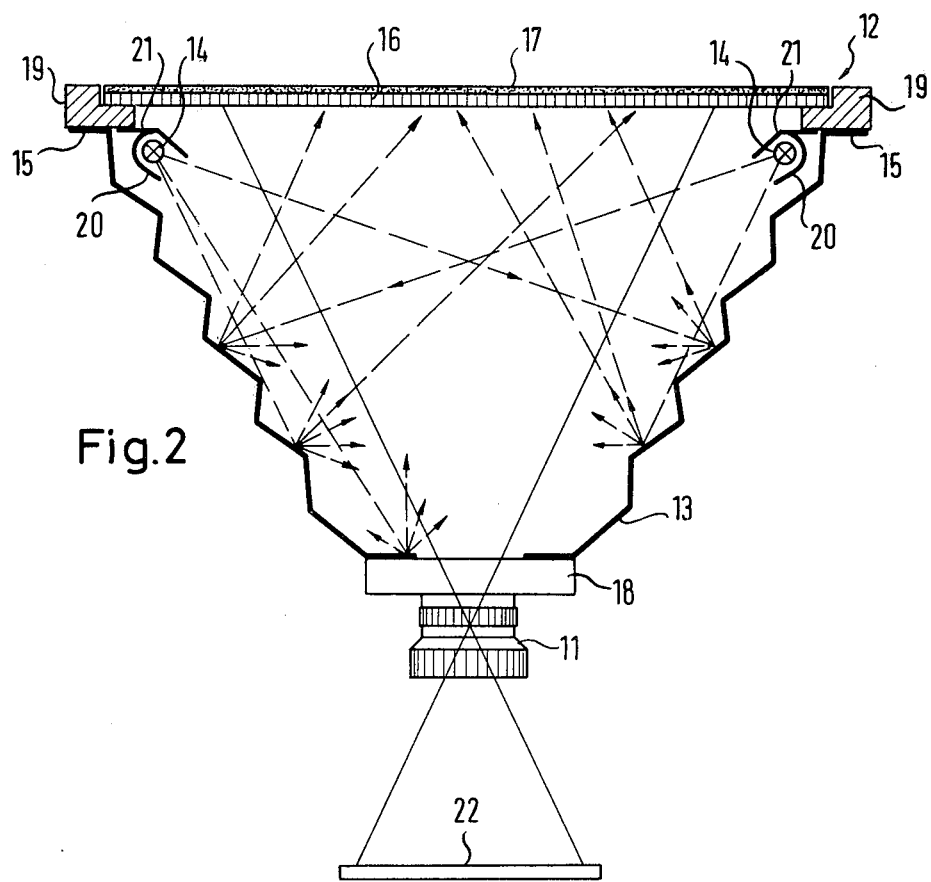

The invention will now be described in the following by way of example only and with reference to the accompanying drawings in which are shown:

FIG. 1 a perspective schematic view of the essential parts of a reproduction camera that are relevant to the present teaching and FIG. 2 a partly sectioned side view of the subject of FIG. 1.

As shown in the drawings the objective 11 of a reproduction camera in accordance with the invention projects the image of an original copy 22 onto lithographic film material 17 which is located in a film holder 12 at the image plane of a reproduction camera and in front of which is arranged a screen 16. A wall, in this embodiment in the form of an extensible bellows 13, which is impermeable to light extends between the image plane 12 and the holder 18 for the objective 11 and makes possible a change of the separation between the image plane 12 and the objective 11.

A respective shielding moulding 19 extends along each of the two longer sides of the upper edge 15 of the generally rectangular bellows in the region of, or preferably closely adjacent to, the image plane. Two spaced apart respective light sources 14 are arranged beneath each visor moulding and incorporate reflectors 20. The reflectors are, as shown in FIG. 2, shaped and aligned so that direct light therefrom only directly impinges on the opposite and neighbouring sides of the bellows 13. A visor 21 at the inner sides of the reflectors has the effect of preventing direct light from reaching the upper regions of the inner wall of the bellows 13 and the image plane. At the outer side the reflector 20 is drawn sufficiently far around the light source 14 that the light leaving the light source 14 reaches the wall associated with the relevant reflector 20 for the first time at its lower regions. The preferred ray paths are schematically illustrated in FIG. 2.

The interior surface of the bellows 13 is matt black so that incident light is scattered in the manner that can be seen in FIG. 2. The interior surface of the objective support 18 should also be made matt black which can be achieved in the manner seen from FIG. 2 by letting the bellows 13 extend over the upper surface of the objective support 18. The priming exposure light sources 14 arranged in accordance with the invention allow, on the one hand, as long a light path as possible between the light source and the film material and on the other hand ensure an extensive uniform scattering of the light. In this manner an exceptionally uniform priming illumination of the film material 17 is achieved. The measures necessary to achieve this are effected with the least possible trouble or expense.

The priming exposure device of the invention has the following further advantages:

On the support of the reproduction camera for the original copy there are usually printed the generally so-called format markings which are intended to assist the operator to position the original copies. The positioning of the copy is especially important when enlargement is to take place because, for example, with a 300% enlargement a 5 mm displacement of the original copy represents 1½ cm on the film plane. Because of the fact that the priming lamps can project light through the open objective and are thus imaged as light points exactly on the border of the format boundary one can use them to optimally determine the position for the original copy. This is done by utilizing the four light points projected from the priming lamps, which as can be seen from FIG. 2 are generally arranged at the corners of the bellows, to supplement or replace the format markings.

This is especially important with small original copies which are typically mounted on sheets of white drawing card because hitherto it was only possible to approximately correctly align such pictures.

The possibility of using the priming lamps for optical control during the reproduction process is also extemely important. As the priming exposure lamps are located adjacent the image plane it follows that when they are sharply imaged via the objective onto the plane of the original copy then, likewise, the original copy is sharply imaged, i.e. in focus, on the image plane. Furthermore if it is desired to enlarge or reduce the original copy to fill the image plane then it is merely necessary to adjust the reproduction camera until the images of the four points of light correspond with the edges or corners of the original copy. This avoids the necessity for the operator to peer through the top of the reproduction camera.

A further advantage of the format witness provided by the image of the light points is that the light points simultaneously give the operator information on the size of the enlargement which it is possible to use to image a given format.

It will be appreciated by those skilled in the art that many modifications can be made to the apparatus without departing from the scope of the teaching. In particular it will be appreciated that it is quite possible to retrofit the illuminating lamps for the priming exposure to existing reproduction cameras. This can be done by simply providing the necessary shielding mouldings and lamp or lamps adapted to be clipped, screwed or otherwise fastened into the reproduction camera adjacent the image plane thereof.

Furthermore any number of priming illuminating lamps are possible and the arrangement could comprise for example, a single strip lamp passing around the periphery of the bellows, or four individual strip lamps each of right angle form for fitting into the corners of the bellows.

Other arrangements of the priming lamps are possible to provide improved format definition in the object plane of the camera. In particular 8 lamps can be used spaced apart in pairs, one pair being located along each side of the generally rectangular border of the film holder.

In customary manner the lamps can be flashed on and off if desired either during the main exposure or before or after the main exposure so as to control the total dose of the priming exposure. Alternatively a single exposure may be sufficient.

In using the priming exposure lamp or lamps for format definition it is of course necessary to adjust the camera by enabling the priming lamps to be switched on before a film is in place to utilize the customarily provided adjustments of the camera for focussing and enlargement to bring the image of the lamp or lamps into focus on the object plane of the camera. The priming lamps can of course be of various kinds such as for example filament bulbs.

The term film holder as used throughout this specification will be taken to mean a holder of any kind for locating any type of lithographic film or other photo sensitive material at the image plane of the recording camera.

I claim:

1. A reproduction camera suitable for producing screen modified images and comprising an objective, a film holder arranged spaced from the objective substantially at the image plane thereof, wall means impermeable to light and extending between the objective and the film holder, at least one source of light for producing a priming exposure and disposed inside the wall means in the region of the film holder, means for preventing direct impingement of light from said at least one source onto the image plane and the interior of said wall means being provided with a light scattering surface for producing scattering of light received from said at least one source onto said image plane.

2. A reproduction camera according to claim 1 and in which said wall means comprises an extensible bellows.

3. A reproduction camera according to claim 1 and in which the said at least one light source is arranged beneath a shielding moulding at the border of the film holder adjacent the image plane.

4. Reproduction camera according to claim 1 in which the, or each said at least one light source is provided with a reflector.

5. Reproduction camera according to claim 4 and characterized in that the or each reflector is so shaped and aligned that light reflected therefrom is in general directed to the middle and lower regions of opposite and neighbouring sides of said wall means.

6. Reproduction camera according to claim 4 in which said at least one reflector shields the upper regions of said wall means from the direct impingement of light from the light source.

7. Reproduction camera according to claim 1 and in which said wall means is of generally rectangular cross section and in which a respective pair of generally spaced apart light sources are provided at each of the two longer sides of the upper edge of said wall means.

8. Reproduction camera according to claim 1 and characterized in that said wall means has an internal matt black surface.

9. Reproduction camera according to claim 1 and in which the internal surface of a support for the objective has a matt black surface.

10. Reproduction camera according to claim 1 and in which said means for preventing direct impingement of light onto the image plane comprises shield means interposed between the image plane and said at least one light source.

11. Reproduction camera according to claim 10 and in which said shield means is provided with a matt blacked surface.

12. Reproduction camera according to claim 7 and in which the said light sources are arranged at the corners of the wall means.

13. Reproduction camera according to claim 12 and in which each of the said light sources is of generally right angled configuration.

14. Reproduction camera according to claim 1 and in which said light source comprises a single strip light arranged around the upper periphery of said wall means adjacent the film holder.

15. A reproduction camera according to claim 1 and in which said at least one light source is arranged closely adjacent said image plane, there being means for adjusting the camera to produce a sharply defined image of said at least one light source in the object plane of said objective whereby to ensure that the image of any original copy disposed in said object plane is sharply defined at said image plane.

16. A reproduction camera according to claim 15 and in which said at least one light source comprises strip lighting arranged around the upper periphery of said wall means.

17. A reproduction camera according to claim 16 and in which said film holder has a generally rectangular border around the image plane and said lighting comprises a single strip light arranged along and adjacent to this border whereby said sharply defined image of said light source is of generally rectangular format defining shape.

18. A reproduction camera according to claim 7, in which said light sources are arranged closely adjacent said image plane there being means for adjusting the camera to produce a sharply defined image of the light sources in the object plane of said objective whereby to ensure that the image of the original copy disposed in said object plane is sharply defined at said image plane.

19. A reproduction camera according to claim 18 and in which said light sources are respectively arranged at respective corners of the wall means to produce format defining images at the object plane of the camera.

20. A priming exposure device suitable for use in a reproduction camera having an objective lens spaced from a film holder disposed substantially at the image plane of the objective and wall means impermeable to light extending between the objective and the film holder, the priming exposure device comprising at least one light source adapted to fit inside a reproduction camera in the region of the image plane, means for preventing, either alone or in combination with a cooperating part of the camera, light from said at least one source impinging directly onto said image plane and means for directing said light onto an internal surface of the wall of the camera.

* * * * *